Patented June 24, 1924.

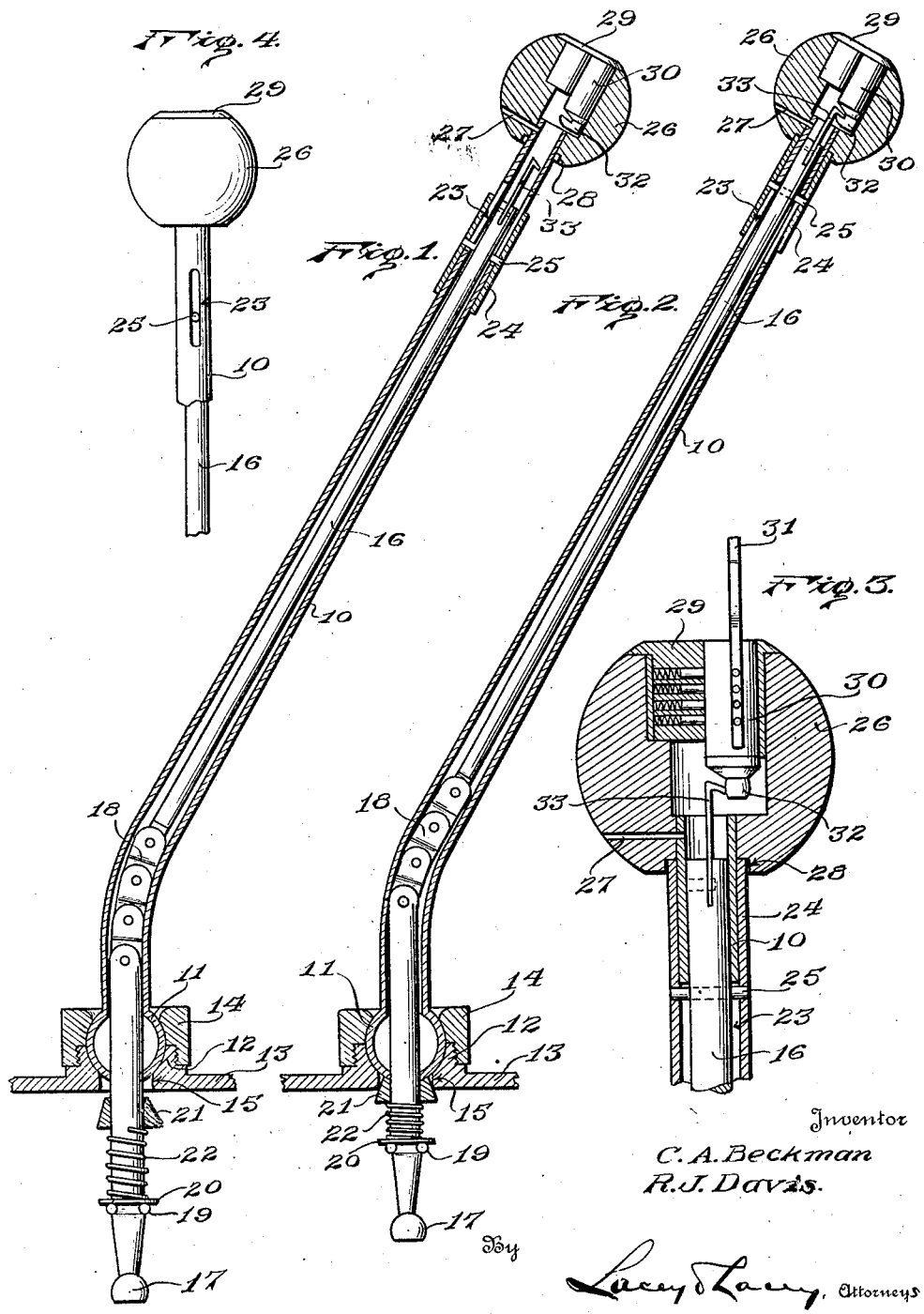

1,499,048

UNITED STATES PATENT OFFICE.

CLARENCE A. BECKMAN AND ROY J. DAVIS, OF PORTLAND, OREGON.

GEAR-SHIFT LEVER.

Application filed July 11, 1922. Serial No. 574,310.

*To all whom it may concern:*

Be it known that we, CLARENCE A. BECKMAN and ROY J. DAVIS, citizens of the United States, residing at Portland, in the county of Multnomah and State of Oregon, have invented certain new and useful Improvements in Gear-Shift Levers, of which the following is a specification.

This invention relates to an improved gear shift lever for motor vehicles and seeks, as one of its principal objects, to provide a lever which may be rendered inactive and locked so inactive to thus prevent shifting of the gears and consequent unauthorized use of a vehicle.

The invention has as a further object to provide a gear shift lever which, in addition to being rendered inactive, may be simultaneously locked against movement.

And the invention has as a still further object to provide a gear shift lever which may be readily employed in connection with motor vehicles of conventional design.

Other and incidental objects will appear hereinafter.

In the drawing:

Figure 1 is a vertical sectional view of our improved gear shift lever,

Figure 2 is a view similar to Figure 1 but showing the lever locked,

Figure 3 is an enlarged sectional view through the upper end portion of the lever, and Figure 4 is a fragmentary elevation of the upper end of the lever.

In carrying the invention into effect, we employ a tubular casing 10 bent near its lower end and provided with a ball-shaped terminal 11 to coact with the socket 12 of a gear case conventionally illustrated at 13, the socket comprising the usual nut 14 detachably connecting the lever with the gear case. As is customary, the gear case is provided with an opening 15 therethrough beneath the socket. Slidably mounted within the casing 10 is a shifter rod 16 projecting at its inner end through the opening 15 into the gear case and provided with the usual toe 17 to engage the usual shifter forks of the transmission gearing, and interposed in the length of the rod at the bend in the casing is a plurality of links 18 whereby the rod may be shifted endwise within the casing. Formed on the rod above the toe 17 are shoulders 19 against which rests a washer 20 and freely surrounding the rod is a frusto-conical locking collar 21 sustained by a spring 22 bearing between the collar and said washer. As shown in Figure 1, the shifter rod terminates at its upper end short of the upper end of the casing and formed in the upper end portion of the casing are oppositely disposed slots 23. Slidably surrounding the casing is a sleeve 24 and extending through said sleeve, through the slots 23 and through the shifter rod, is a pin 25 rigidly connecting the sleeve with the rod. Mounted upon the upper end of the casing is a knob 26 fixed to the casing by a locking pin 27 and formed in the knob at its inner side is an annular channel or seat 28 adapted to accommodate the upper end of the sleeve 24. Mounted in the knob is an appropriate lock 29 having a rotatable cylinder 30 operable by a key 31 and provided at its inner end with a hook 32. Fixed at one end to the upper end of the shifter rod 16 is a spring catch 33 adapted to cooperate with said hook.

As will now be readily understood in view of the preceding description, the sleeve 24 may be manually shifted upon the casing 10 for depressing the rod, as shown in Figure 1, to engage at its inner end with the shifter forks of the transmission so that the rod may be manipulated in the usual manner for shifting the speed gears of the transmission, it being observed that in the normal position of the shifter rod, the locking collar 21 will stand away from the casing 13. However, when it is desired to lock the lever, the sleeve 24 is grasped and raised to the position shown in Figure 2, the key 31 having been previously turned to rotate the lock cylinder 30 for disposing the hook 32 of said cylinder in the path of the spring catch 23. Consequently, when the sleeve 24 is raised, the spring catch will ride over said hook into engagement therewith for securing the shifter rod elevated. In this position of the rod, the sleeve 24 will be received at its upper end within the channel 28 of the knob 26 so that a tool can not be engaged with the upper end edge of the sleeve for forcibly depressing the rod while the lower end of the rod will be elevated to clear the shifter forks of the transmission so that the lever will thus be rendered inactive. Coincidently, upward movement of the rod will serve to shift the locking collar 21 into the opening 15 of the gear case 13 while the spring 22 will be compressed so that the collar will forcibly coact with the gear case for locking the lever against movement. Thus, the lever will not only be locked inactive but will also be locked against rocking movement so that unauthorized use of the vehicle will be effectually prevented. To again render the lever active, the key 21 is turned for rotating the lock cylinder 30 to the position shown in Figure 3, and shifting the hook 32 of the lock out of engagement with the spring catch 33. When this is done, the spring 22, being compressed, will immediately shift the rod 16 downwardly to active position. We accordingly provide a particularly efficient construction for the purpose set forth and, as will now be seen, a lever well adapted for use in connection with various conventional makes of motor vehicles.

Having thus described the invention, what is claimed as new is:

1. A gear shift lever including a casing adapted to be mounted for rocking movement upon a gear case, a lock carried by the casing, a shifter rod slidably mounted within the casing and adapted to be elevated to inactive position secured by the lock, a collar freely surrounding the rod, and a spring sustaining said collar, the collar being movable to coact with the gear case when the rod is elevated compressing said spring and locking the lever against rocking movement.

2. A gear shift lever including a casing adapted to be mounted for rocking movement upon a gear case, a shifter rod slidable within the casing and adapted to be elevated to inactive position, a lock mounted upon the casing and having a sustaining member, and means carried by the rod to ride into engagement with the sustaining member for securing the rod when elevated, said means being free of the sustaining member when the rod is lowered.

3. A gear shift lever including a casing adapted to be mounted for rocking movement upon a gear case, a shifter rod slidable within the casing and adapted to be elevated to inactive position, a lock carried by the casing and having a rotatable cylinder provided with a hook, and a spring catch carried by the rod to engage said hook for securing the rod when elevated.

4. A gear shift lever including a casing adapted to be mounted for rocking movement upon a gear case, a shifter rod slidable within the casing and inactive when elevated, a sleeve slidable upon the casing and connected with said rod whereby the rod may be manually elevated, a lock mounted upon the casing, and means carried by the rod to coact with the lock for securing the rod when elevated.

5. A gear shift lever including a casing adapted to be mounted for rocking movement upon a gear case, a handle member on the upper end of the casing provided with an annular groove in its under side encircling the casing, the casing being provided adjacent said handle member with longitudinal diametrically opposite slots, a shifter rod slidable within the casing and inactive when elevated, a sleeve slidable upon the casing and adapted to have its upper end housed within the annular groove in the base of the handle member, a pin carried by said sleeve and extending through the shifter rod and through the slots in the casing, a lock mounted within the handle member, and a locking device carried by the rod to engage the lock and be secured thereby when the rod is elevated.

In testimony whereof we affix our signatures.

CLARENCE A. BECKMAN. [L. S.]
ROY J. DAVIS. [L. S.]